Patented Sept. 15, 1953

2,652,339

UNITED STATES PATENT OFFICE 2,652,339

SOLUTION OF CELLULOSE ACETATE BUTYRATE

Luther L. Yaeger, Hammond, Ind., assignor to Nash-Kelvinator Corporation, Kenosha, Wis., a corporation of Maryland No Drawing. Application January 28, 1948, Serial No. 4,945

2 Claims. (Cl. 106—179)

This invention relates to the improvement of plastic articles and particularly to treatments for the improvement of surface properties of polystyrene.

The present application is a continuation in part of the co-pending application Serial No. 730,192, filed February 21, 1947, now Patent No. 2,578,665.

Heretofore the practical use of polystyrene resins has been hampered by the following undesirable surface characteristics: sensitivity to crazing, sensitivity to common organic solvents, and extreme electrostatic attraction for dust. These disadvantages were overcome by the development of the integrally bondable coatings for styrene, which were disclosed in the above-mentioned patent application, of which this application is a continuation in part.

An object of the present application is to provide improved coating compositions for polystyrene. Another object is a composition having increased solvent resistance, and being integrally bondable to polystyrene. A still further object is a coating having a higher margin of safety with regard to attack on polystyrene, than has previously been possible.

Further objects will become apparent, as the description proceeds.

In accordance with this invention, I employ as component solvents in the coating compositions, nitromethane, or other mononitrated hydrocarbons having less than four carbon atoms, or mixtures thereof. This makes possible the formulation of coating compositions having the just mentioned distinct advantages.

In the co-pending application already mentioned, the solvents disclosed permitted use as a film former only of cellulose acetobutyrates in which the acetyl content was less than about 8%, and the butyryl content was about 45–50%. If the high solvency ingredients such as the ketones or the aromatic solvents were increased materially, then the styrene would be attacked even before the required solvency was reached for the more resistant high acetyl types of cellulose aceto butyrate.

I have found that the use of nitromethane, or certain other mononitro derivatives further to be detailed below, in conjunction with preponderantly alcohol-type solvents, makes possible the use of the high resistance type cellulose mixed esters, without damage to the polystyrene. The invention is illustrated by the following specific examples, which are given by way of illustrations and not in any sense of limitation. The parts given in the examples are by weight.

Example 1

| | |
|---|---|
| Ethyleneglycol mono ethyl ether acetate | 6 |
| Methyl ethyl ketone | 11 |
| Ethyleneglycol monoethyl ether | 58 |
| Ethyleneglycol monomethyl ether | 19 |
| Ethyl lactate | 6 |
| Nitromethane | 27 |
| Cellulose acetobutyrate having acetyl content of 40% and butyryl content of 20% | 7 |

The ingredients were agitated together slowly until a uniform mixture had resulted.

This product, when applied to polystyrene, gave an integrally bonded firm coating, without attacking the underlying polystyrene sufficiently to be optically observable.

Example 2

Parts

| | |
|---|---|
| Cellulose acetobutyrate having an acetyl content of 38% and a butyryl content of 22% | 8 |
| Methyl methacrylate | 1 |
| Methyl acrylate | ½ |
| Ethyleneglycol monoethyl ether acetate | 10½ |
| Methyl ethyl ketone | 13 |
| Ethyleneglycol monoethyl ether | 67 |
| Ethyleneglycol monomethyl ether | 22 |
| Ethyl lactate | 6 |
| Diacetone alcohol | 17.6 |
| 1-nitropropane | 10 |

While this is a preferred formula, it can be simplified considerably, while retaining adequate performance. For example, the methyl ethyl ketone and the ethyl lactate may be omitted, and the glycolether can be limited to a single member of the series.

Example 3

| | |
|---|---|
| Ethylene glycol monoethyl acetate | 5.2 |
| Nitromethane | 94 |
| Cellulose acetobutyrate, containing 20% butyryl and 40% acetyl groups | 8 |

The composition resulting upon mixing the three above ingredients was applied to polystyrene by spraying. It formed an integrally bonded coating, resistant to the influence of the common solvents and to marring. When the nitromethane content is very high, say above about 80%, it is desirable to have present at least about 5% of an ester or ketone type solvent.

Example 4

| | |
|---|---|
| Cellulose ester, having an acetyl content of 35%, a butyryl content of 15% and a propionyl content of 15% | 7 |
| Ethyleneglycol monomethyl ether | 49 |
| Diacetone alcohol | 30 |
| Nitromethane | 10 |
| Ethyleneglycol monoethylether acetate | 10 |

This coating bonded integrally with good clarity, upon dipping a polystyrene panel into the composition, and allowing to dry at room temperature for 24 hours.

Example 5

| | |
|---|---|
| Cellulose ester, having an acetyl content of 43% and a propionyl content of 16% | 5 |
| Polyethyl acrylate | 1 |
| Polyethyl methacrylate | 3 |
| Ethyleneglycol monoethyl ether acetate | 10 |
| Ethyleneglycol monomethyl ether | 50 |
| Diacetone alcohol | 30 |
| Nitromethane | 30 |
| Nitropropane | 10 |
| Nitrobutane | 2 |

A polystyrene panel was dipped into this composition, and was then dried under infrared lamps at 120° F. In twenty minutes a firm protective coating was obtained, which was integrally bonded to the polystyrene.

Example 6

| | |
|---|---|
| Methyl methacrylate polymer (the grade known as "Du Pont P-1, solid") | 6 |
| Ethyleneglycol monoethyl ether | 30 |
| Cyclohexanol | 20 |
| 2-nitropropane | 20 |
| Diacetone alcohol | 25 |

A part of the methacrylate polymer remained undissolved, and was removed by centrifugation. A polystyrene panel was dipped into the resultant product, and dried as in the preceding example. A clear, integrally bonded protective coat resulted.

Example 7

An acrylate polymer was prepared in the following manner:

| | |
|---|---|
| Methyl methacrylate monomer | 21 |
| N butyl methacrylate monomer | 6 |
| 2,4 dichlorobenzoyl peroxide | ¼ | were heated, reacted together for ½ hour, dissolved in 20 parts of ethyleneglycol monomethyl ether. The temperature was maintained at 85° F. for the first half hour, and was then raised to 120° F. for an additional 20 minutes.

| | |
|---|---|
| The acrylic polymer prepared as just stated | 10 |
| Cellulose aceto butyrate with acetyl content 37%, butyryl content 19% | 5 |
| Nitroethane | 20 |
| Ethanol anhydrous | 5 |
| Ethyleneglycol monomethyl ether | 30 |
| Diacetone alcohol | 20 |

The product thus obtained was sprayed onto polystyrene articles, and, on drying, formed an integrally bonded resistant coating.

While reference has been made to certain specific embodiments of the invention, it should be fully understood that these are by way of example only, and are not to be construed in any sense of limitation.

The nitro derivatives in question may be used in percentages from about 5 up to 95% for nitromethane, and from 5 up to 90%, and preferably from 5% to 35% of nitro derivatives having less than 4 carbon atoms, to increase the solubility of other high resistance cellulose esters in alcohol type solvents, which, without the nitrohydrocarbons, would not be capable of dissolving these solvent cellulose esters; or, if compounded with ketones or aromatic hydrocarbons to give the necessary solvency, would attack polystyrene so as to be unsuitable for use with polystyrene, as contemplated in this application. The alcohol type solvents disclosed have a boiling range between about 140° and 350° F., and include glycols and glycol mono esters and ethers, ethanol, methanol, propanol, butanol, the isomers of amyl alcohol, and generally hydroxyl containing solvents having the same general solvent characteristics as these compounds, with reference to the cellulose esters and to polystyrenes.

The high resistance cellulose esters referred to in this application are characterized, for example, by being insoluble and substantially non-softening in toluol and in ethyl alcohol. These esters have an acetyl content of at least 8%, and the remaining esterifying radicals are preponderantly of acid groups having from 2 to 4 carbon atoms. It might be possible to use a small percentage of higher molecular acids in the esterification of the cellulose, but this is not preferred for the purpose of this invention.

The expression "integrally bonded" as used herein, is intended to convey that the coating to all practical intents and purposes forms one body with the underlying polystyrene; it cannot be removed from it by any amount of mechanical persuasion and it is not possible to discern by the naked eye at which point one layer begins and the other ends.

The expression "polystyrenes" is understood to include also co-polymers or mixtures, in which polymers of monostyrene are the dominating and preponderant ingredient.

In applying the treatment of this invention, it is preferable that the relative humidity should be below 60%. If the humidity is higher than this, the coating is apt to cloud, unless the evaporation is carried out with extreme caution and very slowly. This clouding, however, is avoided by warming the treated surface with infra-red lamps or by pre-heating the air current to temperatures between 110° and 170° F. Under these conditions the coating composition of Example 1, for instance, will dry in about 10 minutes to a point where the articles can be handled and in 20 minutes it will be completely dry. The coating will attain its true hardness in 24 hours on standing.

The present invention makes it possible, likewise, to apply a highly resistant surface coating to extremely thin fibers made by extruding and/or drawing polystyrene type resins. For example, fibers made by extruding polystyrene were passed through the solution of Example 1, in which the solid content had been reduced to a third, while maintaining the proportions otherwise unchanged. The fibers were dried in an air current of 130° F., and were found to be resistant to dry-cleaning solvents. The various conditions of application mentioned above apply to polystyrene type resin surfaces, regardless of the nature of these surfaces, and thus also include the field of fibers.

The ester and ketone type solvents used are employed in percentages from 0 to about 25%. Any esters and ketones boiling between 130 and 350° F. can be employed. For example, useful substances in this group are acetone, methyl ethyl ketone, dibutyl ketone, ethyl acetate, butyl acetate, amyl acetate, methyl butyrate and the like.

The nitro derivatives contemplated include all of the mononitrated aliphatic hydrocarbons, which contain less than four carbon atoms.

The cellulose esters include mixed cellulose esters with aliphatic groups containing from two to four carbon atoms. The preferred cellulose esters for the purposes of this invention are those which have the 2-carbon groups in a preponderance, because the acetic and oxyacetic esters appear to impart to the films an exceptional surface resistance. On the other hand, the nitroparaffinic solvent combinations here described can also be employed for products containing cellulose esters in which propionyl, oxy propionyl, halopropionyl or corresponding butyryl derivatives predominate, though these are not generally as resistant as the preferred coatings disclosed herein.

As shown in the examples, I may find it expedient or desirable to include in the solvent composition minor percentages of still other solvents. The claims are not to be circumvented by the inclusion of such minor percentages of ancillary or auxiliary solvents.

I often prefer to include in the solid part of the non-volatile part of the composition an acrylate, methacrylate, chloroacrylate or crotonate resin. This, also, is not an indispensable part of the invention, as these resins can be dispensed with. I may include still further resinous or other materials, such as, for example, cellulose oxyacetate, non-drying plasticizing alkyds, phenyl salicylate, phosphor and other pigments, including phthalocyanines, and spirit soluble dyes. The inclusion of minor percentages of these or other additional ingredients are not to be construed as a means of circumventing the claims, as these and similar additions are permissible, but irrelevant to the invention, the salient features of which are embodied in the claims. It is thus seen that the invention is broad in scope, and is not to be limited excepting by the claims, in which it is my intention to cover all novelty inherent in the invention as broadly as possible, in view of prior art.

Having thus disclosed my invention I claim:

1. A composition comprising cellulose acetate butyrate having an acetyl content of 8% to 43% and a butyryl content of 15% to 22% dissolved in a solvent mixture consisting of a liquid organic solvent consisting of carbon, hydrogen and oxygen, and from approximately 5% to 90% of a nitro-alkane containing 1 to 3 carbon atoms.

2. The composition of claim 1 in which the nitro-alkane is present in from 5% to 35% of the composition.

LUTHER L. YAEGER.

References Cited in the file of this patent

UNITED STATES PATENTS

| Number | Name | Date |
|---|---|---|
| 1,791,301 | Davidson | Feb. 3, 1931 |
| 1,880,502 | Shannon | Oct. 4, 1932 |
| 2,008,976 | Carroll | July 23, 1935 |
| 2,229,617 | Wampner | Jan. 21, 1941 |
| 2,322,310 | Muskat et al. | June 22, 1943 |
| 2,366,564 | Shaw | Jan. 2, 1945 |
| 2,367,503 | Hunter et al. | Jan. 16, 1945 |

FOREIGN PATENTS

| Number | Country | Date |
|---|---|---|
| 255,406 | Great Britain | Jan. 21, 1927 |
| 585,530 | Germany | Oct. 10, 1933 |

OTHER REFERENCES

Condensed Chemical Dictionary 1942, 3rd edition, pages 468 and 470.